(12) United States Patent
Schwinn et al.

(10) Patent No.: US 6,405,133 B1
(45) Date of Patent: Jun. 11, 2002

(54) DISPLAYING LIGHTNING STRIKES

(75) Inventors: Daniel J. Schwinn, Boston, MA (US); Theodore H. Cannaday, Staley, NC (US); Frederic D. Barber, Beverly; David P. Bedrosian, Franklin, both of MA (US)

(73) Assignee: Avidyne Corporation, Lincoln, MA (US)

( * ) Notice: Subject to any disclaimer, the term of this patent is extended or adjusted under 35 U.S.C. 154(b) by 0 days.

(21) Appl. No.: 09/362,772

(22) Filed: Jul. 28, 1999

Related U.S. Application Data

(60) Provisional application No. 60/094,876, filed on Jul. 30, 1998.

(51) Int. Cl.[7] .............................................. G06F 169/00
(52) U.S. Cl. ........................................................ 702/4
(58) Field of Search .......................... 702/4, 3; 342/26, 342/460; 706/931; 340/600, 601, 602; 324/72; 345/440, 589, 473

(56) References Cited

U.S. PATENT DOCUMENTS

| | | | | |
|---|---|---|---|---|
| 4,673,929 A | * | 6/1987 | Nelson et al. ............... 340/703 |
| 4,803,421 A | * | 2/1989 | Ostrander .................... 324/72 |
| 5,097,268 A | * | 3/1992 | Bauer, Jr. et al. ........... 342/160 |
| 5,227,786 A | * | 7/1993 | Hancock ..................... 340/961 |
| 5,289,184 A | * | 2/1994 | Suzuki ........................ 340/905 |
| 5,519,392 A | * | 5/1996 | Oder et al. .................. 340/995 |
| 5,664,084 A | * | 9/1997 | Smith .......................... 345/440 |
| 5,699,067 A | * | 12/1997 | Brown et al. ................ 342/176 |
| 5,850,619 A | * | 12/1998 | Rasmussen et al. ........... 702/3 |

OTHER PUBLICATIONS

Avidyne Corporation Company Manual, "Avidyne Flight Situation Display Quick Reference Guide," 1998, Rev. 00.

* cited by examiner

*Primary Examiner*—Donald E. McElheny, Jr.
(74) *Attorney, Agent, or Firm*—Fish & Richardson, P.C.

(57) ABSTRACT

Lightning strikes are displayed as uniformly-structured (e.g., gaussian) kernels that decay in size and intensity over time. The lightning strikes may be displayed as they occur, or stored for later display. Overlapping areas of the kernels are displayed in different colors than corresponding non-overlapping areas. A color (or colors) displayed in an overlapping area is a function of the number of kernels that overlap in that area.

42 Claims, 13 Drawing Sheets

DISPLAYING LIGHTNING STRIKES

CROSS REFERENCE TO RELATED APPLICATION

This application claims priority from U.S. Provisional Application No. 60/094,876, filed Jul. 30, 1998, and entitled "Lightning Detection Processing And Display".

BACKGROUND OF THE INVENTION

This invention relates generally to displaying lightning strikes.

Electrical storms pose a host of problems for aircraft pilots. For example, lightning can wreak havoc on in-flight electronics and instrumentation. Of greater concern, however, is the air turbulence that always accompanies electrical storms. The strength of this turbulence makes it dangerous for aircraft, particularly small aircraft, to fly through electrical storms.

Equipment therefore has been developed which enables pilots to detect, and thus avoid, electrical storms during flight. This equipment typically includes a detector for detecting electrical activity of nearby storms, and a monitor for displaying lightning strikes (meaning any electrical discharge) occurring in these so-called storm cells. Current lightning strikes are depicted on the monitor as an "x" or a "+", which remains displayed for an amount of time, after which the "x" or "+" is removed.

Lightning displays, such as those described above, make it difficult for pilots to interpret the information that they are receiving. For example, it is difficult to determine the spatial density of lightning in a particular area using such a display. It is also difficult to determine storm trend information, such as whether a storm is increasing or decreasing in intensity.

SUMMARY OF THE INVENTION

The invention displays lightning strikes as uniformly-structured (e.g., gaussian) kernels that decay over time. For one example of decay, the kernels may decrease in size over time, in order to indicate how long ago lightning strikes occurred in an area.

Preferably, each kernel is a circular area that can be conceptualized as a standard gaussian surface of rotation. A visible feature, such as intensity, of each pixel in the circular area corresponds to the height of a corresponding point on the gaussian surface. In addition to gaussians, surfaces of rotation for any (convex) contours, such as cones, may be used to conceptualize the kernels. overlapping areas of the kernels are displayed in different colors than corresponding non-overlapping areas of those kernels. The colors may differ in terms of hue, intensity and/or saturation, in any combination. For example, a non-overlapping area may be displayed as yellow, and a corresponding overlapping area displayed as red to indicate a relatively higher density of lightning.

The color of an overlapping area is a function of the number of kernels that overlap in that area, of the center positions of displayed kernels, and of the elapsed time since each kernel was first displayed. For example, if several kernels overlap, the overlapping area-may be displayed as red to indicate a high density of lightning and, if several more kernels overlap, the overlapping area may be displayed as magenta to indicate an even higher density of lightning in that area.

Thus, in a given area, the kernels vary in size and color based on the number of lightning strikes in that area and the time that those strikes occurred. The display therefore provides pilots with a clear picture of lightning density and storm trends in the given area.

Lightning strikes may be displayed as they are detected (in real-time) or they may be stored for later display. Thus, the history of a storm may be recorded and stored for later playback. The pilot is given control over how this history information is displayed. For example, the pilot can display the strikes as gaussian kernels or even as discrete symbols (e.g., "x's"), if desired. Likewise, the pilot can alter the rate at which recorded history information is displayed, and thereby view lightning information in a historical context.

According to one aspect, the invention displays a lightning strike as a uniformly-structured kernel that decays over time. This aspect of the invention may also include one or more of the following features/functions.

The uniformly-structured kernel comprises a gaussian kernel. The lightning strike is detected, its location is determined, and the lightning strike is displayed based on the detected location. The location of an aircraft may be displayed relative to the lightning strike. Decay of the kernel may be depicted as a decrease in size and/or amplitude of the gaussian kernel over time.

Two or more lightning strikes may be displayed as uniformly-structured kernels that decay over time. Areas of kernels for these lightning strikes that overlap may be displayed in one or more different colors than corresponding non-overlapping areas of kernels for the two or more lightning strikes. A color of an overlapping area is a function of a number of kernels that overlap in that area.

According to another aspect, the invention displays lightning strikes by storing information relating to a lightning strike and retrieving the information. The lightning strike is displayed, based on the information, as a uniformly-structured kernel that decays over time. This aspect of the invention may also include one or more of the following features/functions.

The lightning strike is detected and its location is determined. The information relating to the lightning strike may include the location of the lighting strike and/or a time that the lightning strike occurred. The information may include a record of lightning strikes that occurred over a period of time, where each lightning strike corresponds to a uniformly-structured kernel that decays over time. The rate at which the record of lightning strikes is displayed may be controlled. A current location of an aircraft relative to the lightning strike may be displayed by determining the current location relative to the lightning strike, and displaying the current location. A warning is displayed regarding current lightning strikes while the retrieved lightning strike information is being displayed.

According to still another aspect of the invention, lightning strikes are displayed by assigning uniformly-structured kernels to lightning strikes. The uniformly-structured kernels comprise pixel matrices in which pixels at centers of the matrices have greater values than pixels at edges of the matrices. An overlapping portion of two or more uniformly-structured kernels is displayed by summing pixel values in the matrices of the two or more uniformly-structured kernels at the overlapping portion.

This aspect of the invention may include one or more of the following. Pixel values in the pixel matrices correspond to colors on a color continuum. Pixels values in the pixel matrices are reduced by an amount at set time periods until the pixel matrices have zero values.

According to still another aspect, the invention displays two or more lightning strikes as uniformly-structured kernels, where portions of two or more of the uniformly-structured kernels overlap in an area. A color of the area is a function of a number of uniformly-structured kernels that overlap in the area.

In this aspect, additional lightning strikes may be displayed as uniformly-structured kernels, where portions of one or more of the uniformly-structured kernels overlap in the area. The color of the area increases in amplitude based on the number of uniformly-structured kernels that overlap the area. The color of the area may be one or more of a continuum of colors ranging from magenta at a high color amplitude to black at a low color amplitude.

According to still another aspect, the invention displays lightning strikes, in response to a user input, as either (i) uniformly-structured kernels that decay over time, or (ii) as discrete symbols.

According to still another aspect, the invention displays a bearing line for navigating around lightning strikes. Lightning strikes are displayed on a display screen, and a bearing line is also displayed on the display screen relative to the lightning strikes. The lightning strikes may be displayed as uniformly-structured kernels that decay over time, or as discrete symbols, and the bearing line may be movable relative to the strikes.

Other advantages and features will become apparent from the following description and the claims.

DESCRIPTION OF THE PREFERRED EMBODIMENT

Figure 1:
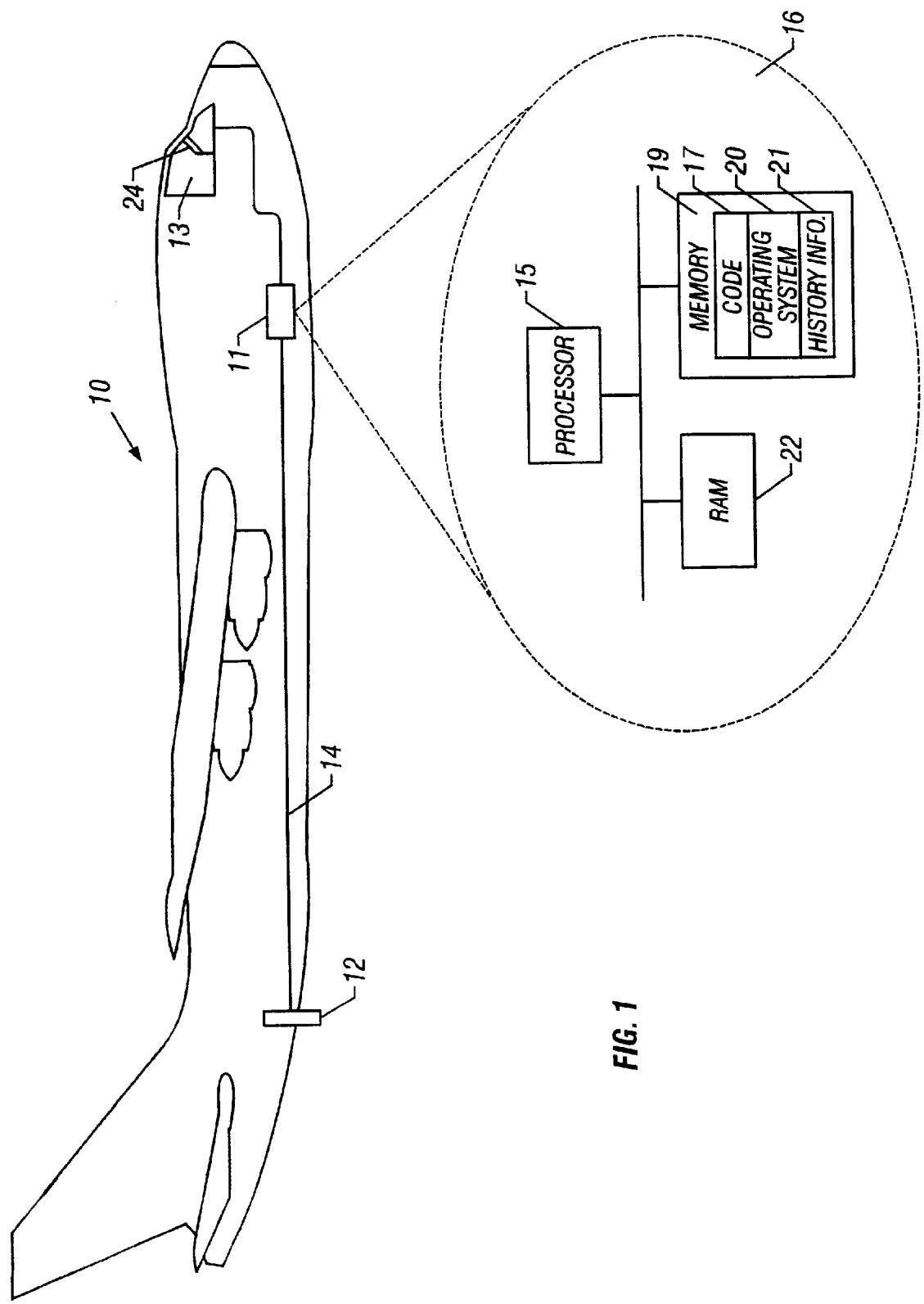
FIG. 1 is a schematic and block diagram of an aircraft that includes a storm sensor for detecting lightning strikes and a computer for displaying detected lightning strikes.

FIG. 1 shows an aircraft 10 which includes an embodiment of the invention. Aircraft 10 may be a commercial jetliner, a private (single or multi-engine) airplane, or any other type of aircraft. Included on aircraft 10 are an internal computer system 11, a storm sensor 12, a user interface 24, and an internal bus 14.

Storm sensor 12 is a BF Goodrich® Avionics Stormscope® WX-500 Weather Mapping System; however, other types of storm sensors may be used. Storm sensor 12 detects lightning strikes that occur up to 200 nautical miles away from aircraft 10. It determines the relative location (bearing and range) of these lightning strikes and provides that information to computer system 11 via internal bus 14.

Computer system 11 includes a processor 15 (see view 16) which executes computer code 17 in order to perform various functions, including displaying lightning strikes based on information provided by storm sensor 12. Memory 19 is a computer-readable medium which stores computer code 17, an operating system 20 such as Windows® NT, and lightning strike history information 21 (described below). Memory 19 may be a computer hard disk or any other type of computer memory whose type and size permit storage and retrieval of given data. Random access memory ("RAM") 22 is also provided for executing computer code 17.

Figure 2:
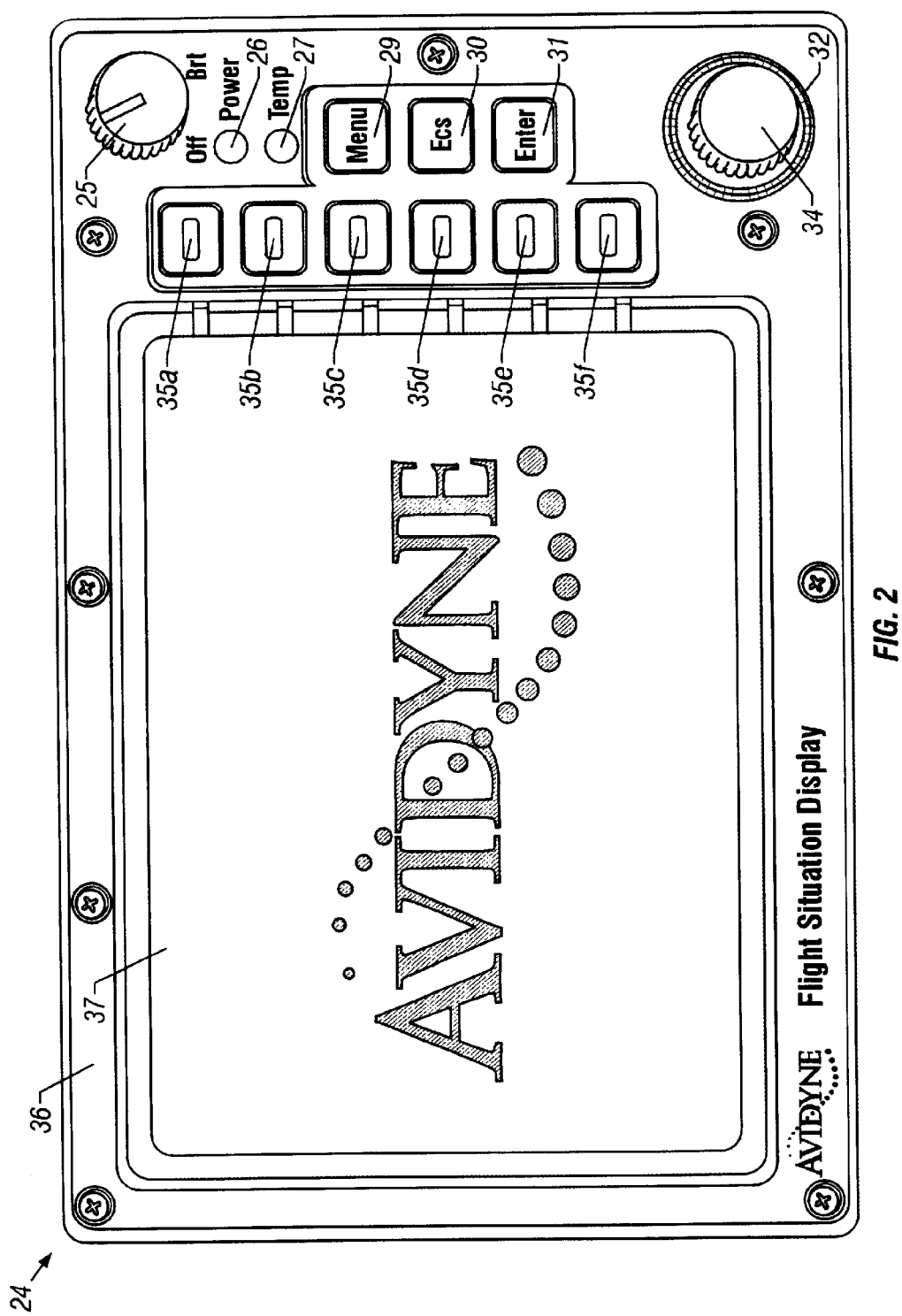
FIG. 2 is a front view of a cockpit display showing a user interface to the computer.

FIG. 2 shows user interface 24 to computer system 11, which is located in cockpit 13 of aircraft 10. User interface 24 is an Avidyne® Flight Situation Display ("FSD"), or similar computer interface. User interface (hereinafter FSD) 24 includes Off/Brt knob 25, power light 26, temp light 27, menu key 23, escape key 30, enter key 21, large (outer) knob 32, small (inner) knob 34, line select keys 35a to 35f, and monitor 36.

Monitor 36 is a high-fidelity color monitor that has a display screen 37 for displaying images. Off/Brt knob 25 serves two purposes. It turns FSD 24 on and off and controls the brightness of display screen 37. Power light 26 indicates the power status of FSD 24. If power light 26 is illuminated, aircraft power is being supplied to FSD 24 and FSD 24 is on. If power light 26 is not illuminated, either FSD 24 is off or aircraft power is not being supplied to FSD 24. Temp light 27 indicates the internal operating temperature of FSD 24. Large (outer) knob 32 and small (inner) knob 34 are used to position a cursor on display screen 37 (either vertically or horizontally), among other things. Finally, menu key 29, escape key 30, enter key 31, and line select keys 35a to 35f are used to navigate through menus displayed on display screen 37.

Figure 3:
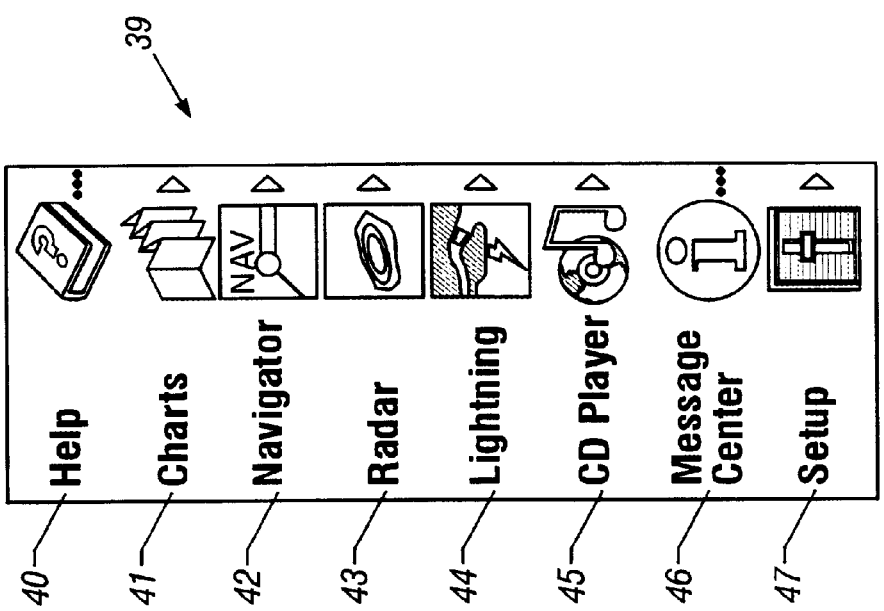
FIG. 3 is a front view of a system menu.

Menus are generated by code 17. FIG. 3 shows the basic menu structure of FSD 24. FSD 24 uses a tree-structured menu system, with the trunk of the tree comprising system menu 39. Each of the eight major functions 40 to 47 is represented by a menu that forms a branch of the tree. In each menu, functions are assigned to line select keys 35a to 35f to the right of each menu function (see FIG. 4). Each line select key is used to select a corresponding function. For example, in FIG. 4, line select key 35e is used to select Lightning function 44.

Figure 4:
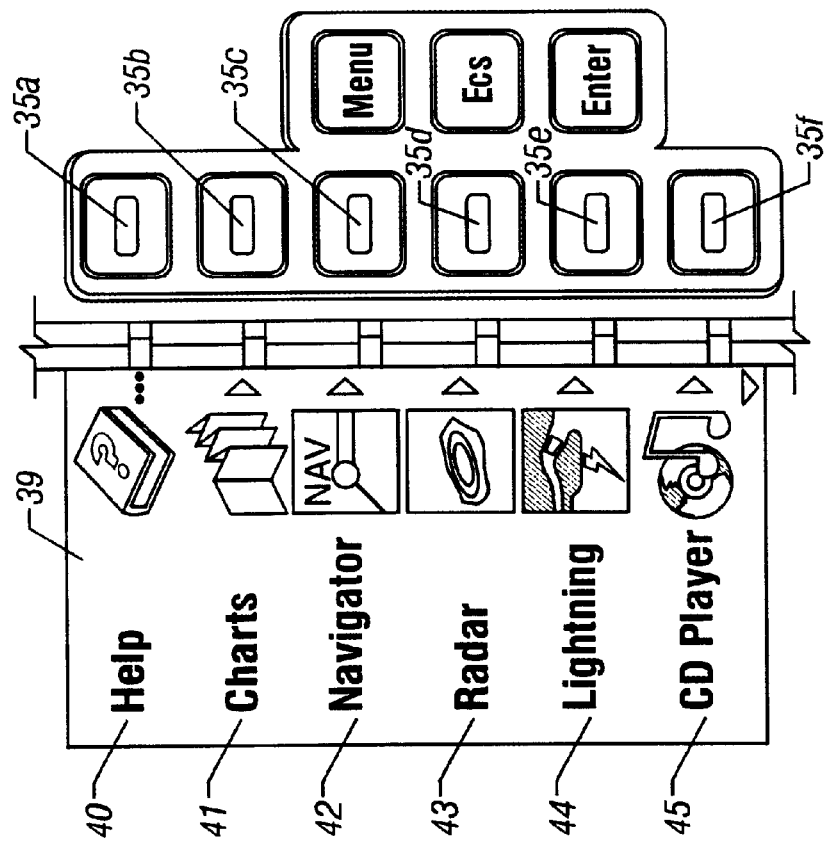
FIG. 4 is a front view of keys for selecting functions, such as a lightning main menu, from the system menu.

Escape key 30 (FIG. 2) brings a user back to a previous menu in the hierarchy. Menu key 29 recalls previous menus and/or shifts menus on the display screen 37 to view additional function icons that do not fit onto display screen 37. As shown in FIG. 4, icons for only six of the eight functions shown in system menu 39 (FIG. 3) can be displayed on display screen 37 at once.

Although system menu 39 includes eight functions, only Lightning function 44 is of concern. However, for the sake of completeness, each of the other functions is described briefly. Help 40 provides instructions for using FSD 24; Charts 41 retrieves stored navigational charts; Navigator 42 controls an automated moving map and navigation system; Radar 43 controls an airborne weather radar system; CD Player 45 controls compact discs in a CD-ROM drive (not shown); Message Center 46 displays informational messages received from airborne and ground systems; and Setup 47 is used to configure FSD 24.

Lightning function 44 controls the display of lightning strikes on display screen 37. Pressing line select key 35e from system menu 39 causes lightning main menu 49 (FIG. 5) to appear on display screen 37. Lightning main menu 49 includes view option 50, clear strikes option 51, mode option 52, settings option 54, history option 55, and help option 56.

Help option 56 provides information about the operation of the lightning display function. View option 50 is a toggle function for selecting between a forward view (FIG. 6), in which lightning strikes detected in front of aircraft 10 are displayed, and a centered view (FIG. 7), in which lightning strikes detected over a 360° range 53 surrounding aircraft 10 are displayed. Clear strikes option 51 allows the pilot to clear strikes from display screen 37 and also from memory 19.

Mode option 52 is a toggle function that allows the pilot to select different processing options (strike mode or cell mode) in storm sensor 12. Strike mode is somewhat more sensitive than cell mode and tends to detect lightning strikes earlier, but exhibits certain sensing artifacts, such as radial spread, in areas of high electrical activity. Cell mode suppresses the sensing artifacts by clumping strikes together to represent thunderstorm cells more closely. Cell mode offers a more accurate, easier to interpret, display in areas of high electrical activity. It does this, however, at the expense of some capacity for early detection of developing or distant storms.

Figure 8:
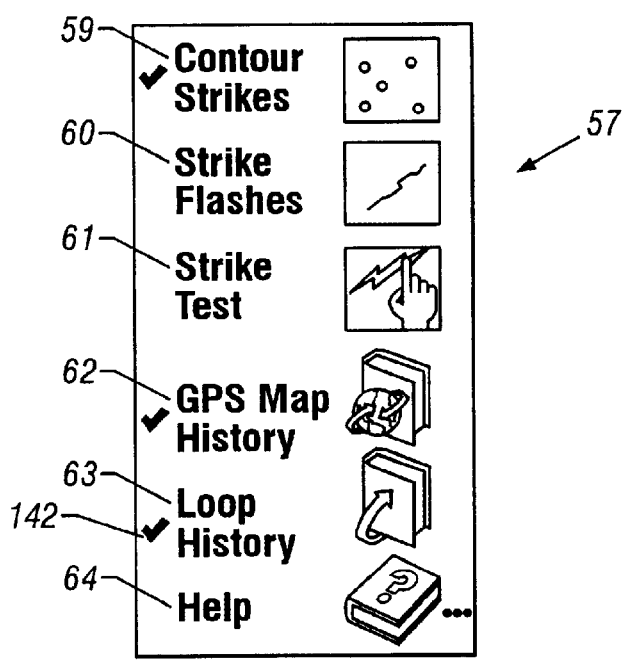
FIG. 8 is a front view of a submenu of the lightning main menu.
Figure 9:
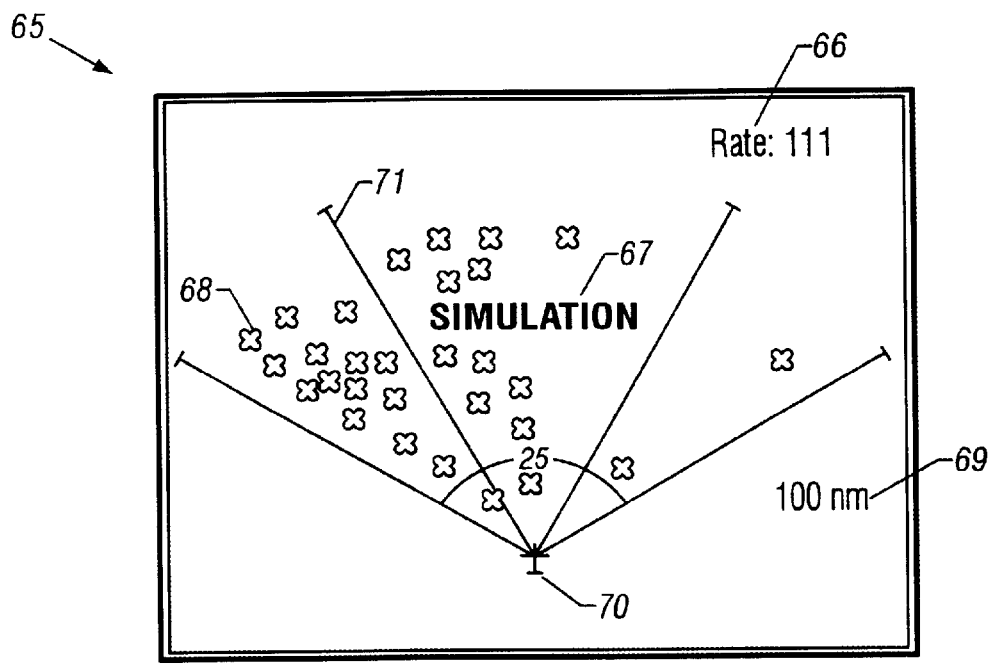
FIG. 9 is a front view of the cockpit display showing a forward, non-contoured display of lightning strikes detected by the storm sensor.

Settings option 54 displays submenu 57 of FIG. 8. Submenu 57 includes options 59 to 64 that enable and disable specialized display modes. Option 59 allows the pilot to choose between a contoured display and a "normal" display. The contoured display mode is described in detail below. In the normal display mode, lightning strikes are represented as discrete symbols (e.g., "x") 68 shown in FIG. 9. Display 65 includes strike rate indicator 66, annunciator area 67, display range indicator 69, aircraft symbol 70, and azimuth lines 71. These features are described below.

Option 60 is a toggle function that allows a pilot to add strike flashes (see below) to display screen 37. Strike test option 61 is a toggle function that activates a test function in storm sensor 12. In strike test mode, storm sensor 12 generates test strikes in a known location every two seconds. On a properly working system, these test strikes appear and disappear in a predetermined location at regular intervals. GPS Map history 62 and Loop history 63 are described in detail below.

Contoured Display Mode

In the contoured display mode, code 17 displays lightning strikes as uniformly-structured three-dimensional kernels (e.g., gaussian surface of rotation kernels) that decay in both size and amplitude (e.g., color) over time.

Figure 6:
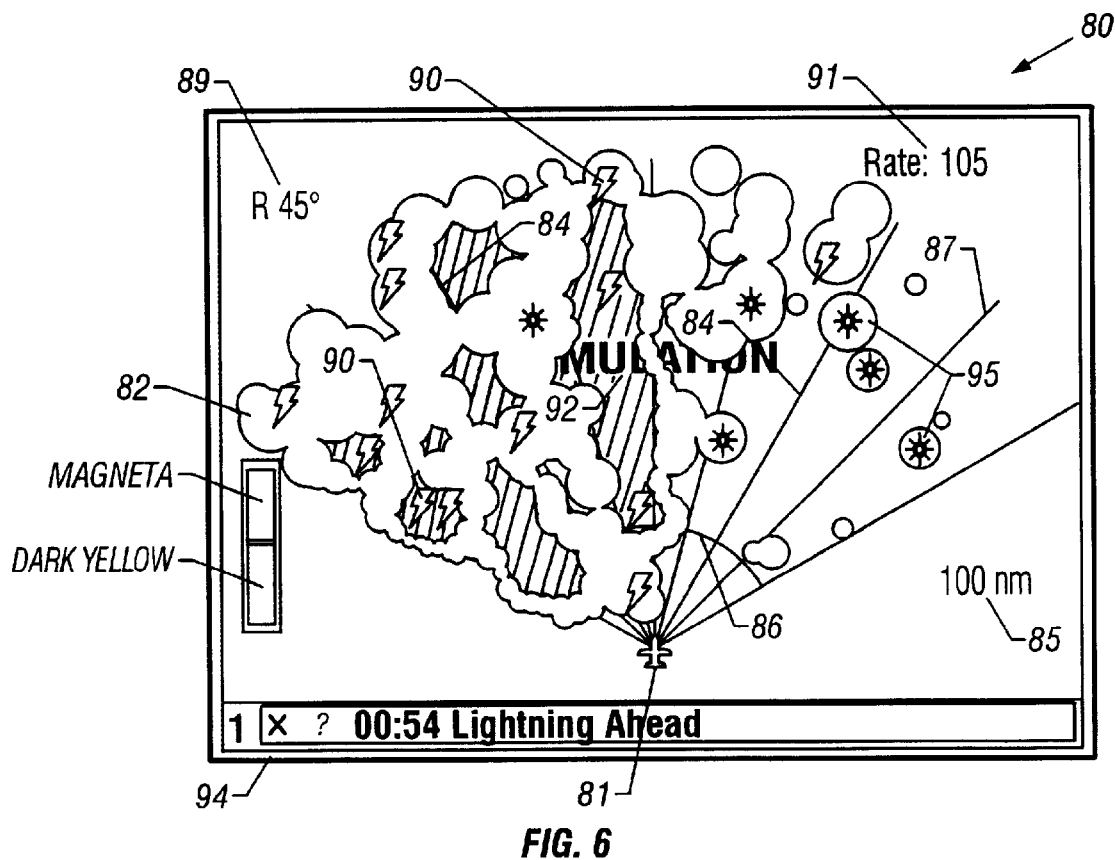
FIG. 6 is a front view of the cockpit display showing a forward, contoured display of lightning strikes detected by the storm sensor.
Figure 7:
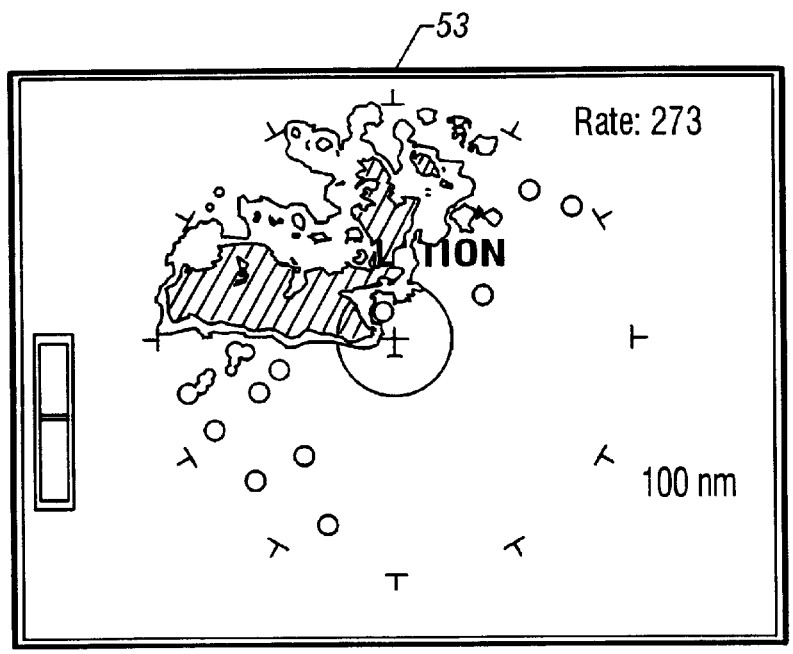
FIG. 7 is a front view of the cockpit display showing a centered, contoured display of lightning strikes detected by the storm sensor.

FIG. 6 shows a contoured display page 80 generated by code 17. Page 80 includes aircraft symbol 81, which shows the position of aircraft 10 in relation to lightning strikes 82. Lightning strikes 82 are displayed based on location information provided by storm sensor 12. Azimuth marks 84 denote relative bearings from the heading of aircraft 10 at 30° intervals. Display range indicator 85 shows the total sensing range of storm sensor 12 in nautical miles (from aircraft 10 to the outer ends of azimuth marks 84). Small (inner) knob 34 (FIG. 2) controls the current display range. The 25 nautical mile ring 86 separates nearby electrical activity from more distant activity.

Bearing line 87 allows the pilot to set a precise bearing for navigating around (including between) lightning strikes 82. Large (outer) knob 32 controls angular movement of bearing line 87 on the display screen. Bearing indicator 89 shows the angular position of bearing line 87. Bearing line 87 and bearing indicator 89 may be removed from display screen S7 after 15 seconds of nonuse.

Strike flashes 90 are lightning "bolts" which depict where lightning strikes have occurred within the past five seconds. Strike rate indicator 91 displays the number of strikes per minute that occur within the range represented by page 80 based on recent activity. Annunciator area 92 indicates circumstances warranting special interpretation of the displayed data, for example: "SIMULATION". "Lightning Ahead" message 94 indicates that lighting has been detected in the area defined by azimuth marks 84.

Regarding the "Lightning Ahead" function, processor 15 continuously examines a designated guard zone within a range detected by storm sensor 12 and, upon detecting a lightning strike that exceeds a predetermined threshold (in terms of intensity), annunciates (e.g., displays a message or issues an audio warning) that there is lightning ahead. The "Lightning Ahead" message 94 is displayed even when the primary lightning display is suppressed, thereby permitting use of the display for multiple functions (such as the display of lightning history information, described below) while still providing an indication of currently-occurring of lightning.

As noted, in the contoured display mode, a detected lightning strike 95 is displayed as a gaussian kernel that decays over time. A gaussian kernel is a two-dimensional, substantially circular area.

Figure 10:
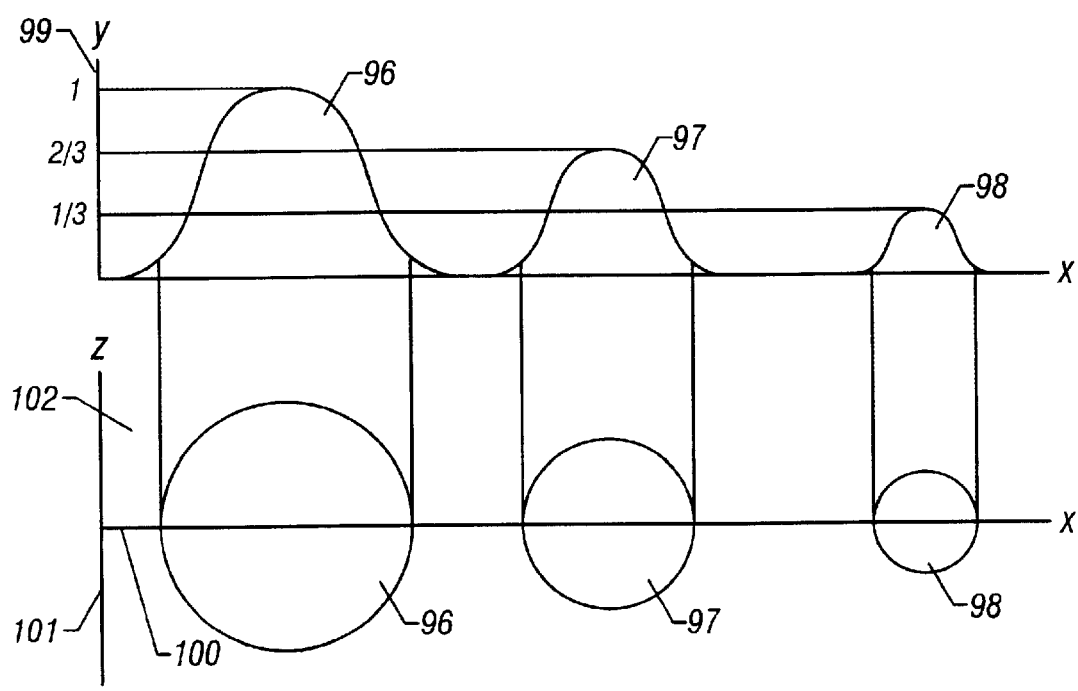
FIG. 10 shows top and bottom views of area and amplitude measurements of gaussian kernels for detected lightning strikes.

Referring to FIG. 10, gaussian kernels 96, 97, 98 can be conceptualized as follows. The amplitude of each gaussian kernel is represented along a "y" axis 99 (the vertical direction). The area of the gaussian kernel is in a plane defined by an "x" axis 100 and a "z" axis 101 (the horizontal plane). The amplitude and the area of each gaussian kernel are predetermined and uniform regardless of the strengths of the detected lightning strikes. For example, upon detection, each lightning strike may be represented by gaussian kernel 96.

Each gaussian kernel is displayed in "x-z" plane 102, which corresponds to display screen 37 of monitor 36. When a kernel does not overlap another kernel in "x-z" plane 102, the area of the kernel is displayed as a single circle 96 having a predetermined area, such as 9×9 pixels or 24×24 pixels. When an operator "zooms in" to a smaller range scale, the kernel is made larger relative to the screen, and, when the operator "zooms out" to a larger range scale, the kernel is made smaller relative to the screen.

A gaussian kernel is "displayed" for three minutes after initial detection; although it can only be seen by the human eye for about 2.5 minutes. During the course of its three minute display period, the gaussian kernel progressively and linearly decays. Both the amplitude (the intensity) and the area (i.e., the size) of the kernel will decrease from full amplitude/area to zero amplitude/area in that three minutes. This time decay occurs on a second by second basis. For example, in FIG. 10, kernel 96 may decay, over time, to kernel 97 and then to kernel 98.

The amplitude of an individual gaussian kernel is represented using a color gradient that ranges from black to yellow. The color of the kernel changes gradually from black at its outer circumference, to dark yellow at its inner circumference, to bright yellow at its center.

Figure 11:
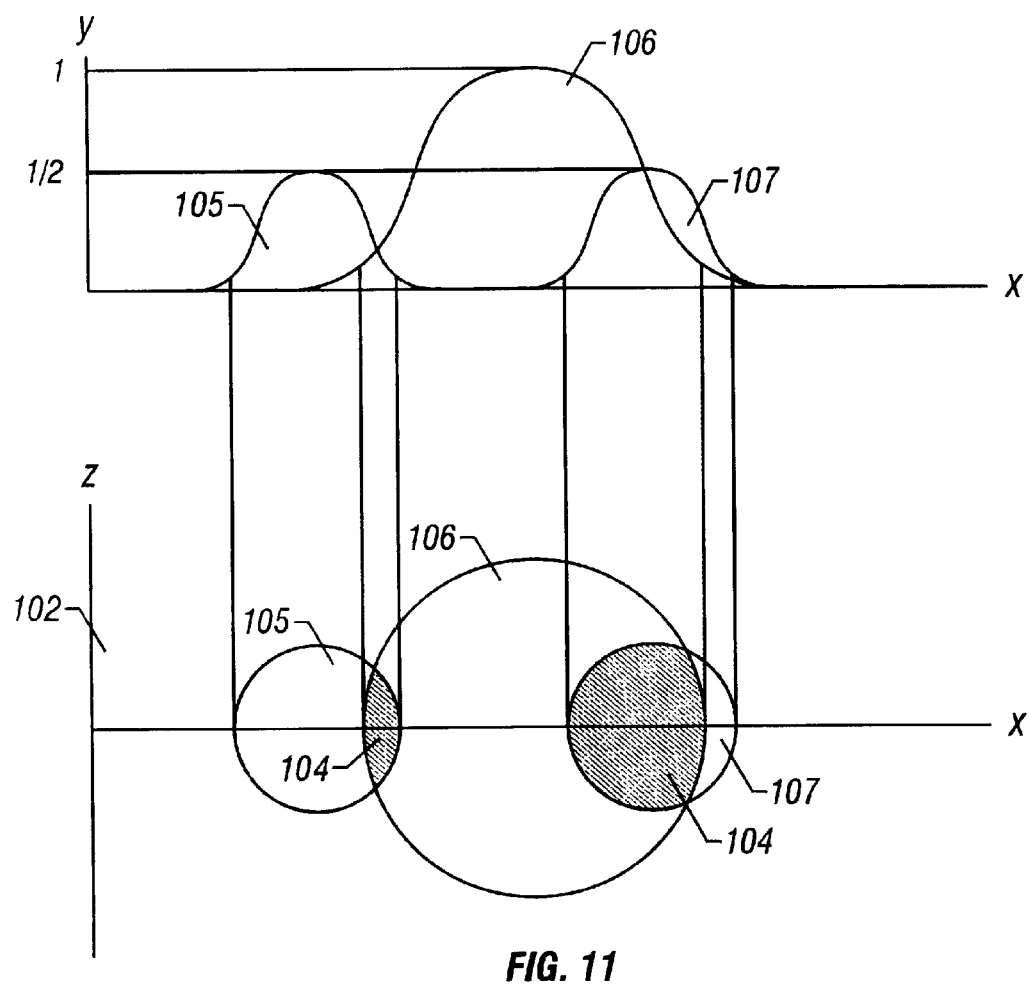
FIG. 11 shows top and bottom views of overlapping areas of gaussian kernels.
Figure 12:
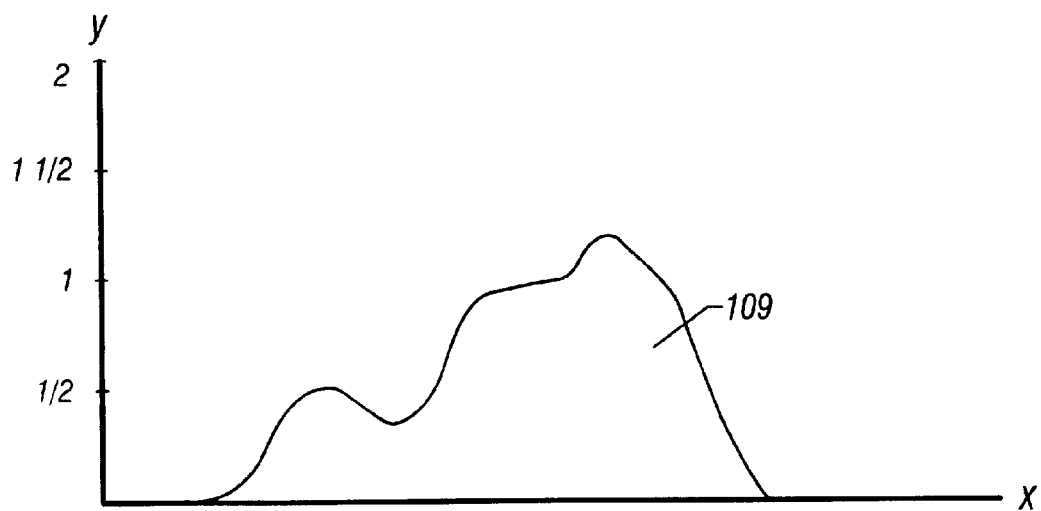
FIG. 12 shows a display function generated by summing pixels of overlapping gaussian kernels.

The amplitudes of overlapping areas 104 (FIG. 11) of gaussian kernels 105, 106, 107 are summed pixel-by-pixel in "x-z" plane 102. The result of this summation determines the amplitude values of the resulting display function 109 shown in FIG. 12, and thus the colors of pixels in the display. Overlapping areas of two kernels are displayed in a different (higher amplitude) color than corresponding non-overlapping areas of those same kernels. Color differences include differences in hue, saturation or intensity, or any combination thereof. High-amplitude (overlapping) areas are represented by higher-valued colors (e.g., magenta) than low-amplitude (e.g., non-overlapping) areas.

Figure 13:
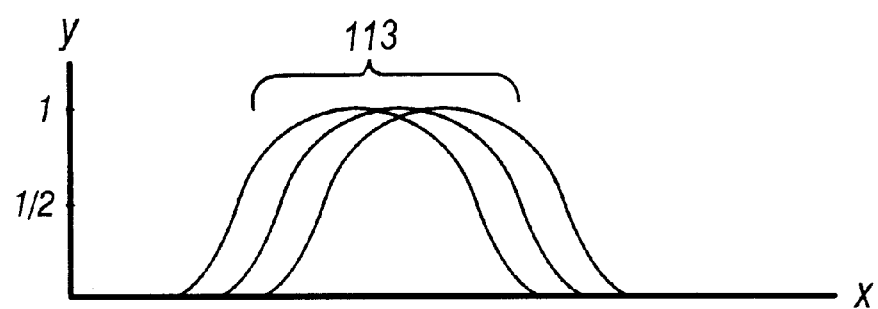
FIG. 13 shows overlapping gaussian kernels.
Figure 14:
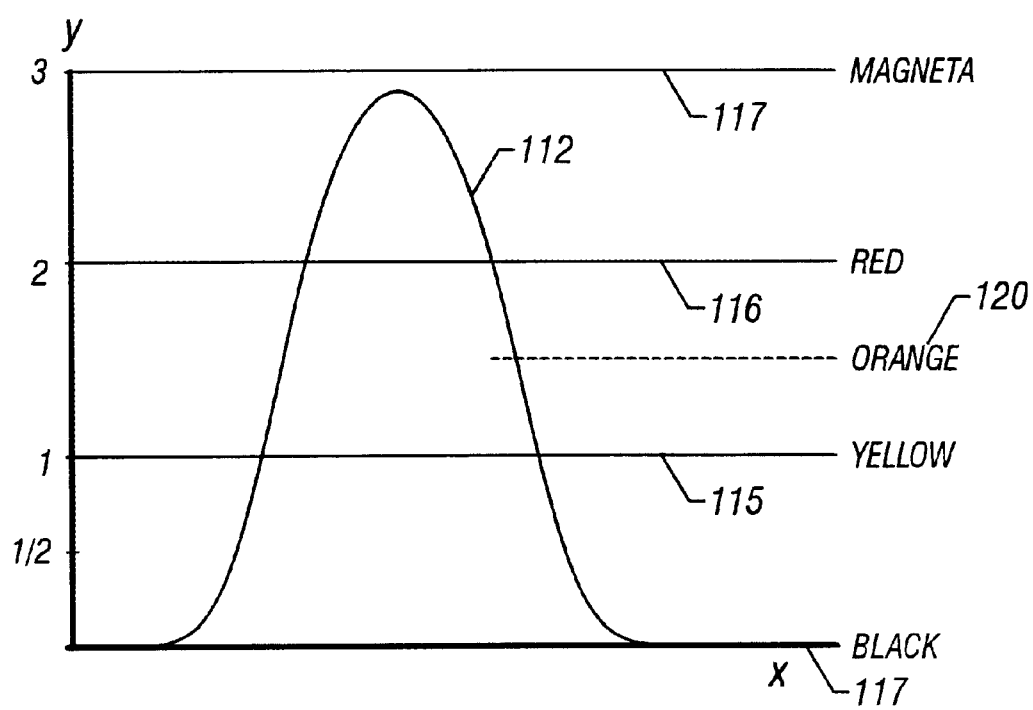
FIG. 14 shows an example of a color gradient in relation to a display function generated from overlapping gaussian kernels.

More specifically, as shown in FIG. 13, kernels 113 are summed to function 112 in FIG. 14. In function 112, pixels are displayed as black 114 at zero amplitude, yellow 115 at full amplitude, red 116 at twice full amplitude, and magenta 117 at three times full amplitude. Higher-valued colors, such as magenta, can be obtained as a result of either a few close and nearly simultaneous lightning strikes or a larger number of close lightning strikes that occur within a three minute time period.

Although color combinations in the color gradient are discrete and finite, the gradient is designed to have the appearance of a continuum bounded by black 114 at the minimum and magenta 117 at the maximum (see also strike contouring scale 119 in FIG. 6). Thus, for example, overlapping kernels may result in orange 120 (between yellow and red) being displayed in the overlapping areas, depending upon the number of overlapping kernels and where those kernels overlap (e.g., in a dark yellow region versus a bright yellow region). As kernels decay, the colors of the overlapping areas will change accordingly. Thus, to summarize, the color of an overlapping area is a function of the number of kernels displayed in that area, the center positions of the displayed kernels, and the elapsed time since each kernel was first displayed.

Figure 15A:
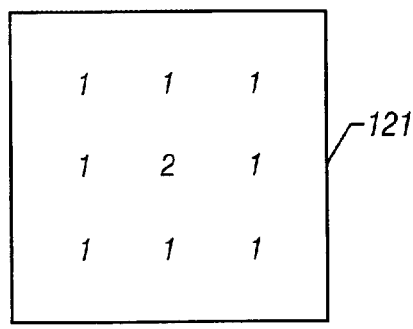
FIGS. 15a, 15b and 15c show pixel summing in matrices for three overlapping gaussian kernels.
Figure 15B:
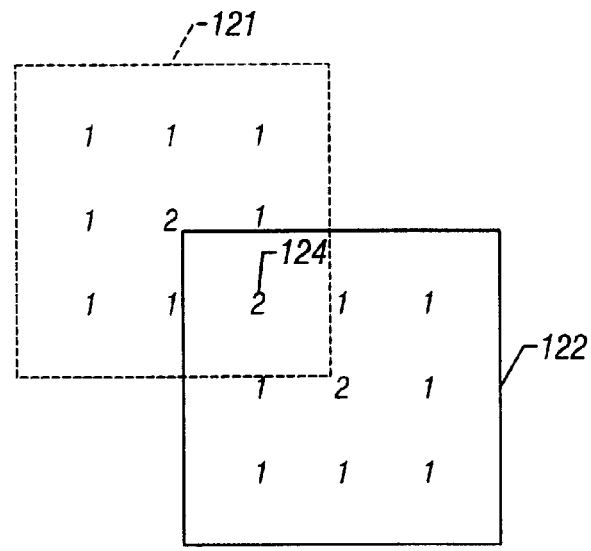

For example, FIG. 15a shows a 9×9 pixel matrix 121 for a gaussian kernel of a single lightning strike. In this simplified example, "1" is a low-amplitude color (dark yellow), "2" is a higher-amplitude color (bright yellow), and "3" is a still higher-amplitude color (orange). FIG. 15b shows what happens to values in matrix 121 for the first gaussian kernel when a matrix 122 of a second gaussian kernel overlaps at pixel 124. That is, the value of pixel 124 becomes the sum of corresponding pixels for the two matrices (namely, "2").

Figure 15C:
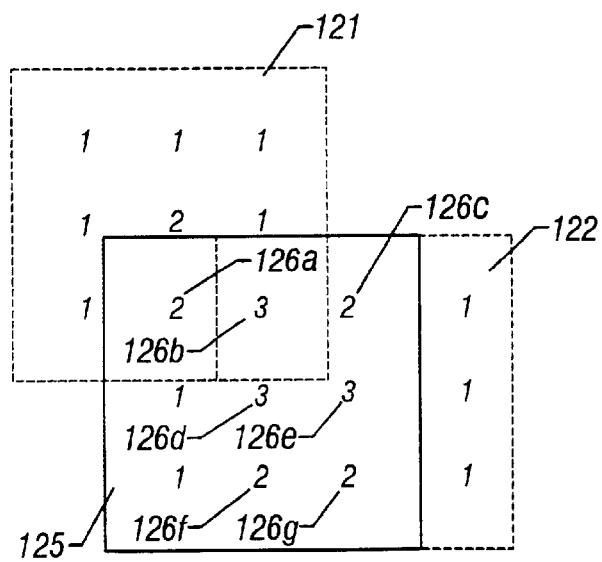

FIG. 15c shows what happens when a matrix 125 for a third gaussian kernel overlaps matrices 121 and 124. Individual pixel values 126a to 126g are summed accordingly.

Figure 16A:
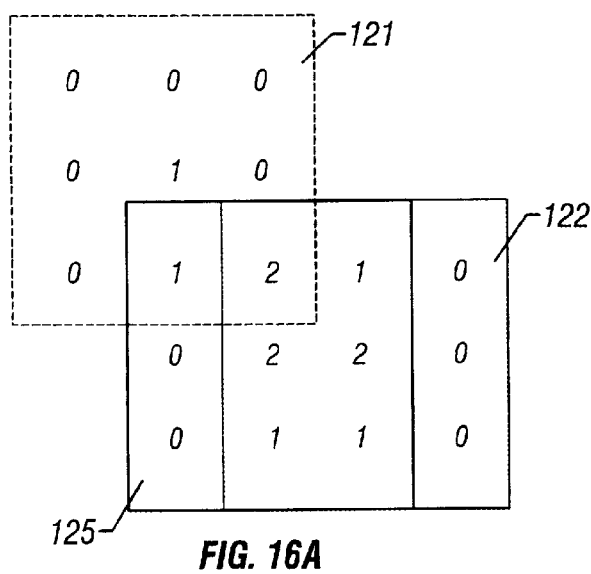
FIGS. 16a, 16b and 16c show decay of gaussian kernels using their matrices.
Figure 16B:
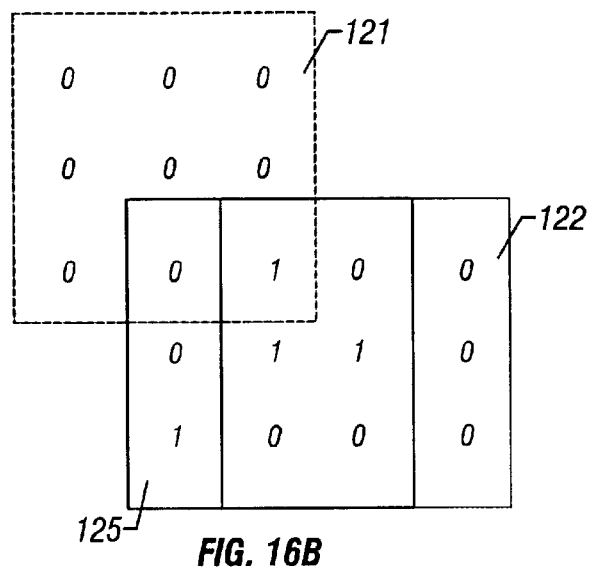
Figure 16C:
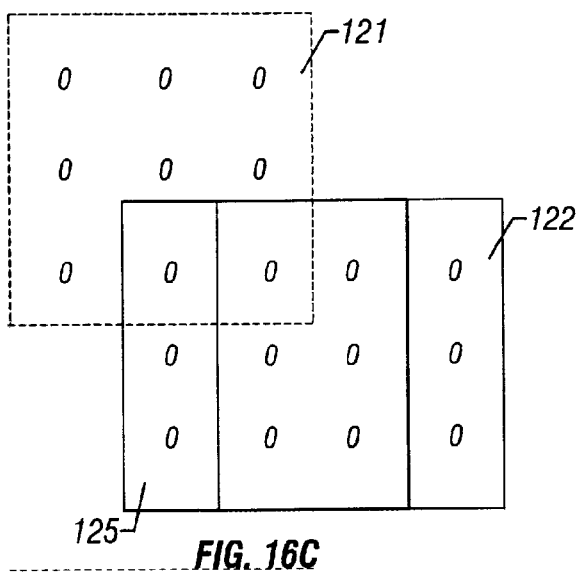

After a period of time elapses, individual values in matrices 121, 122 and 125 are decremented (by one), leaving the values shown in FIG. 16a. Thereafter, following another period of time, the remaining values are further decremented by one leaving the values shown in FIG. 16b. Following a three minute window after the third gaussian kernel was detected, the remaining values are further decremented by one, leaving a black space (i.e., all "0" pixel values) as shown in FIG. 16c.

Figure 17:
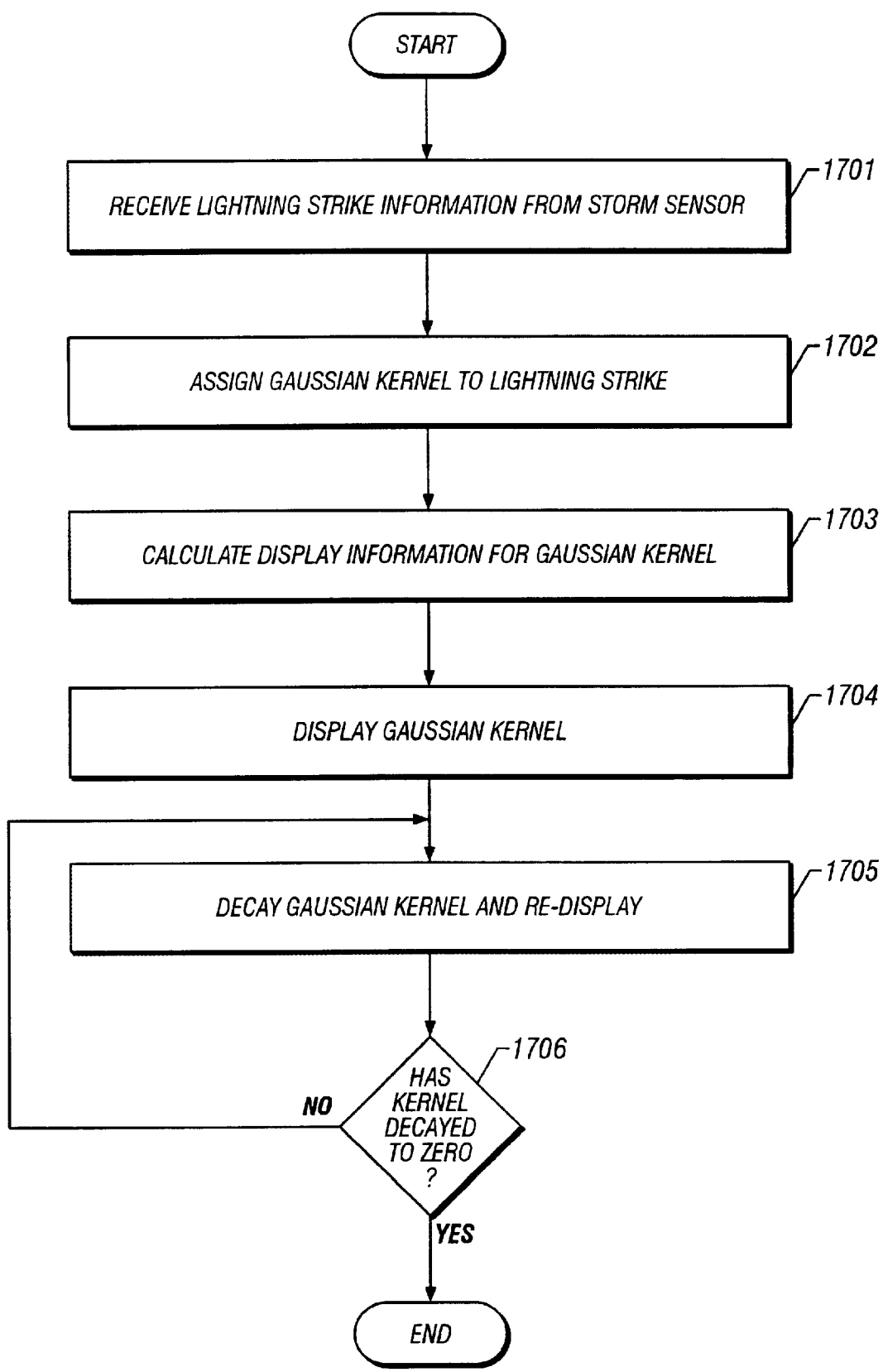
FIG. 17 is a flow diagram that shows a process for displaying lightning strikes as gaussian kernels that decay over time.

In FIG. 17, the operation of code 17 is shown. Code 17 receives 1701 lightning strike information from storm sensor 12. This information indicates that a lightning strike was detected and includes a location of the lightning strike relative to aircraft 10. The information may include a time that the lightning strike occurred, or code 17 may assign a time to each newly-detected lightning strike.

Code 17 assigns 1702 a gaussian kernel to the newly-detected lightning strike. As noted, the gaussian kernel for each lightning strike has an identical amplitude and area. Code 17 then calculates 1703 display information for the gaussian kernel. In particular, code 17 determines a display location for the gaussian kernel (based on the location information provided by storm sensor 12). Once the display location is determined, code 17 sums pixel values in areas of the gaussian kernel that overlap currently-displayed gaussian kernels, and displays 1704 the gaussian kernel for the lightning strike. Pixel summing affects the color of the resulting display, as described above.

The gaussian kernel remains displayed for three minutes. During that three minute time period, the kernel is "decayed" and re-displayed 1705 roughly every second. Decaying is performed as shown in FIGS. 10 and 16a to 16c, in which pixel values in a matrix for the kernel are decremented until, eventually, they reach zero. Code 17 determines 1706 if all pixel values in the current kernel are zero. If so, the kernel is no longer displayed. If some pixel values are non-zero, code 17 repeats 1705 and 1706 until the current kernel is no longer displayed.

Displaying Lightning History

Returning to FIG. 5, history option 55 allows a pilot to store information related to lightning strikes, retrieve that information, and display the lightning strikes using the retrieved information. During flight of aircraft 10, code 17 stores, in memory 19, information relating to all lightning strikes detected by storm sensor 12 in the past thirty minutes. Included in this information is the location of each strike as well as the time that the strike occurred. At any time, the pilot may select history function 55 to review past lightning strike information.

Figure 18:
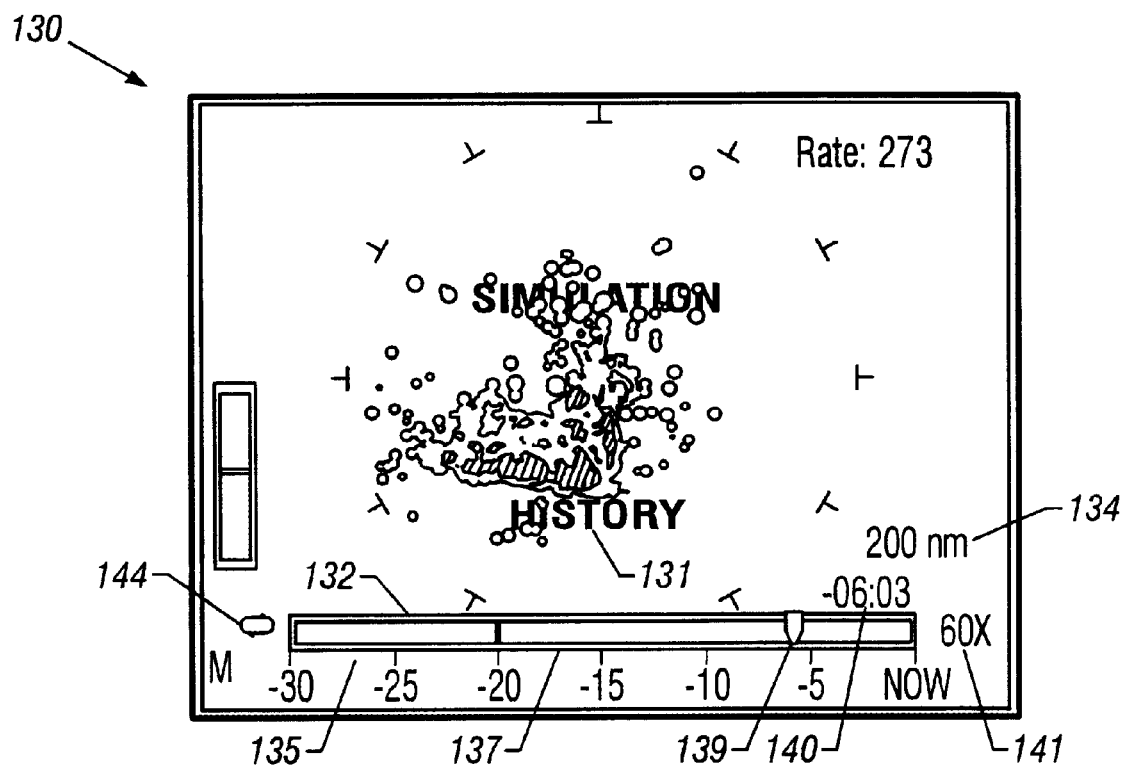
FIG. 18 is a front view of the cockpit display showing a history page for displaying stored lighting strike information.

Selection of history function 55 suppresses a current display of lightning strikes in favor of a "history" page 130 shown in FIG. 18. History page 130 displays the recorded strike data and provides the pilot with control over its playback. When history playback is in operation, a large yellow annunciation 131 and other distinctive history features (such as playback indicator 132) are displayed to indicate that the strikes are not "live".

In FIG. 18, the pilot selects beforehand the display range 134 that is to be used in playback mode. While on history page 130, knobs 32 and 34 are used to control playback. Other display mode controls, such as forward view, cell mode, normal display mode (FIG. 9), and contour strikes display mode (FIG. 6), may be used to emphasize different aspects of recorded lightning strikes. Lightning Ahead message 94 of FIG. 6 (not shown in FIG. 18) continues to alert the pilot of the presence of lighting based on actual (real-time), not recorded, storm scope information.

Time scale 135 shows how much lightning history information is available and which portion thereof hag been selected for display. Portion 137 of playback indicator 132 represents the portion that has been selected for playback.

Currently, thirty minutes of information are available; however, this may vary depending upon the amount of memory available. The playback time is indicated by slider 139. Numeric value 140 is the number of minutes and seconds in the past that the currently-displayed strikes were recorded.

Large (outer) knob 32 (FIG. 2) controls the start point of history playback (portion 137). Small (inner) knob 34 controls the playback rate of recorded lightning strike information, including the decay rate of displayed kernels. A numeric playback rate indicator 141 is provided which indicates that rate of playback of the information on page 130. A playback rate of 60 times "real-time" is shown; however, playback rates up to and including 120 times "real-time" are provided by the system. Increasing the playback rate allows the pilot to "speed up time" during playback.

History information may run through once, in which case the system will return to "live" data display when it reaches the end of a playback sequence. This is set in option 63 of submenu 57 (FIG. 8). Alternatively, option 63 may be set to "loop" history information (activation is indicated by check mark 142 in FIG. 8). In this case, each pass through the loop will start at the same time offset in the past and will proceed to the current time. Loop indicator 144 indicates if history page 130 is set in loop mode. Using the loop feature, it is possible to see up-to-date lightning strike information in a historical context.

In FIG. 8, selecting GPS (global positioning system) map option 62 on submenu 57 displays previously-stored strikes during playback with reference to a current position of aircraft 10. Computer system 11 receives GPS information concerning a current location of aircraft 10 via a ground or satellite RF (radio frequency) link. It then determines the current location of the aircraft relative to prior lightning strikes, and displays the current location of the aircraft relative to the previous lightning strikes. If GPS map history option 62 is not selected, lightning strikes are played back with reference to a location of aircraft 10 when the lightning strikes were detected.

Figure 5:
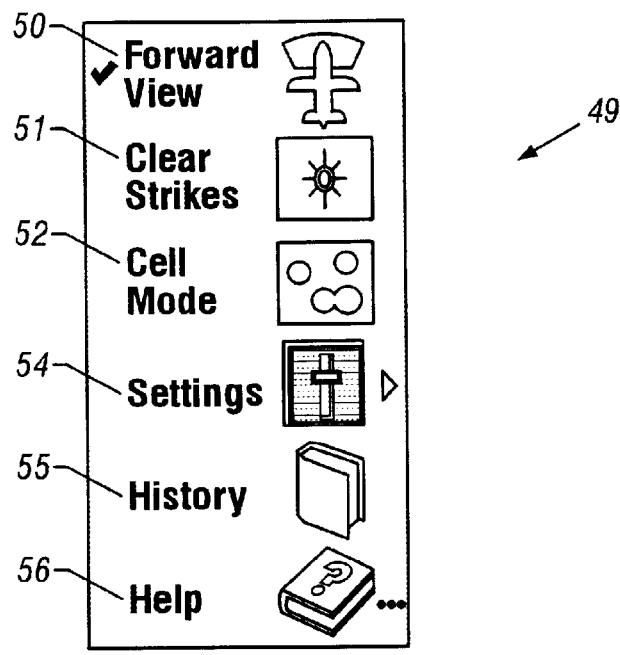
FIG. 5 is a front view of the lightning main menu.
Figure 19:
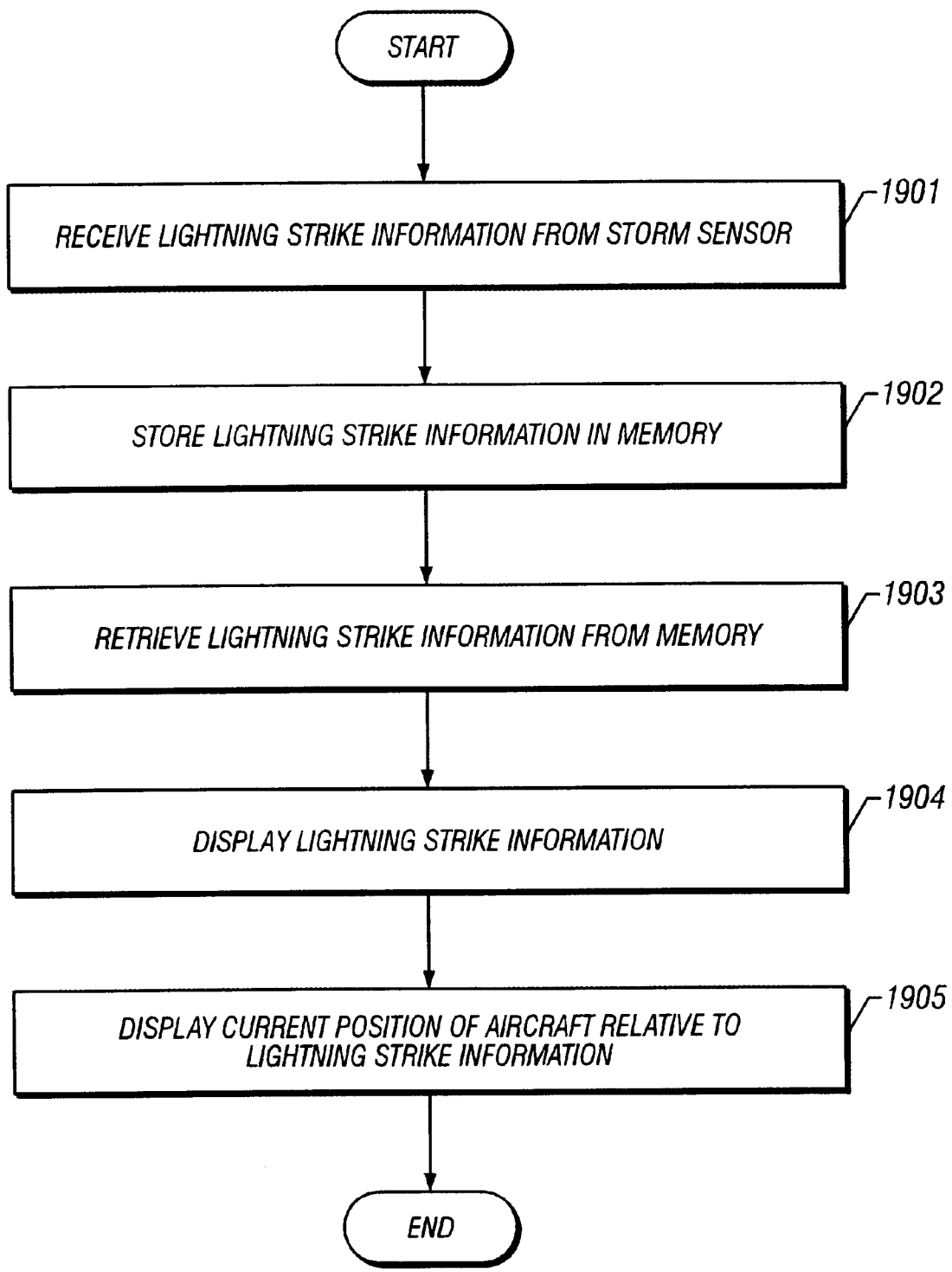
FIG. 19 is a flow diagram showing a process for displaying stored lighting strike information.

In FIG. 19, the operation of code 17 is shown. Code 17 receives 1901 lightning strike information (including a time and location of the strike) from storm sensor 12, and stores 1902 that information in memory 19. In alternative embodiments, storm sensor 12 may store the lightning strike information in an internal memory. Code 17 retrieves 1903 the lightning strike information from memory in response to an instruction input by a pilot. For example, lightning strike information is retrieved when the pilot selects history option 55 (FIG. 5). The retrieved lightning strike information is then displayed 1904. In 1905, a current position of the aircraft may be displayed relative to a location of the lightning strikes, as described above. However, this is not a requirement.

The invention is not limited to the features described herein. For example, kernels other than gaussian kernels may be used. In fact, any uniformly-structured kernel, meaning any kernel having a color at its center which decreases in amplitude towards its edges (e.g., bright yellow to black), may be used. Kernels can be used that vary in amplitude and area based on the intensity of the lightning strikes (provided an appropriate storm sensor is used to obtain such information). A color scale other than "black to magenta" can be used, and additional colors added to increase display contrast and resolution. For example, in non-color displays, grayscale values may be used. The gaussian kernels can remain displayed for more or less than three minutes, e.g., for 10 minutes.

Moreover, the invention is not limited to the specific hardware and software described herein. For example, storm sensor 12 can be the Strikefinder® by Insight®, instead of the WX-500. The Strikefinder® includes a semiconductor memory, in which lightning strike information can be stored. Also, while the invention has been described in the context of airplanes, it can be used on any aircraft that uses storm sensing equipment.

Other embodiments not specifically described above are also within the scope of the following claims.

What is claimed is:

1. A method comprising displaying a lightning strike as a uniformly-structured kernel that decays over time, the uniformly-structured kernel having an inner portion and an outer portion, the inner portion having a higher amplitude than the outer portion, the amplitudes of the inner portion and the outer portion decreasing as the uniformly-structured kernel decays.

2. The method of claim 1, wherein the uniformly-structured kernel comprises a gaussian kernel.

3. The method of claim 1, further comprising:
   detecting the lightning strike; and
   determining a location of the lightning strike;
   wherein the lightning strike is displayed based on the location of the lightning strike.

4. The method of claim 3, further comprising displaying a location of an aircraft relative to the lightning strike.

5. The method of claim 1, further comprising displaying two or more lightning strikes as uniformly-structured kernels that decay over time;
   wherein overlapping areas of uniformly-structured kernels for the two or more lightning strikes are displayed in one or more different colors than corresponding non-overlapping areas of uniformly-structured kernels.

6. The method of claim 5, wherein a color of an overlapping area is a function of a number of uniformly-structured kernels that overlap in that area.

7. The method of claim 6, wherein different colors for overlapping areas are obtained by summing pixel values in the overlapping areas; and
   wherein different pixel values map to different colors on a color continuum.

8. The method of claim 1, wherein decay of the uniformly-structured kernel is shown as a decrease in size of the uniformly-structured kernel over time.

9. A method of displaying lightning strikes, comprising:
   storing information relating to a lightning strike;
   retrieving the information; and
   displaying the lightning strike, based on the retrieved information, as a uniformly-structured kernel that decays over time, the uniformly-structured kernel having an inner portion and an outer portion, the inner portion having a higher amplitude than the outer portion, the amplitudes of the inner portion and the outer portion decreasing as the uniformly-structured kernel decays.

10. The method of claim 9, wherein the information includes a record of lightning strikes that occurred over a period of time, each lightning strike corresponding to a uniformly-structured kernel that decays over time; and
   further comprising controlling a rate at which the record of lightning strikes is displayed.

11. The method of claim 9, further comprising:
   detecting the lightning strike; and
   determining a location of the lightning strike;

wherein the information relating to the lightning strike includes a location of the lighting strike.

12. The method of claim 9, wherein the information relating to the lightning strike includes a time that the lightning strike occurred.

13. The method of claim 9, further comprising:
determining a current location of an aircraft relative to the lightning strike; and
displaying the current location of the aircraft relative to the lightning strike.

14. An apparatus comprising:
a display screen which displays images;
a memory which stores a computer program; and
a processor which executes the computer program to display, on the display screen, a lightning strike as a uniformly-structured kernel that decays over time, the uniformly-structured kernel having an inner portion and an outer portion, the inner portion having a higher amplitude than the outer portion, the amplitudes of the inner portion and the outer portion decreasing as the uniformly-structured kernel decays.

15. The apparatus of claim 14, wherein the uniformly-structured kernel comprises a gaussian kernel.

16. The apparatus of claim 14, further comprising a storm sensor which:
detects the lightning strike; and
determines a location of the lightning strike;
wherein the lightning strike is displayed based on the location of the lightning strike.

17. The apparatus of claim 16, wherein the processor executes the computer program to display a location of an aircraft relative to the lightning strike.

18. The apparatus of claim 14, wherein:
the processor executes the computer program to display two or more lightning strikes as uniformly-structured kernels that decay over time; and
overlapping areas of uniformly-structured kernels for the two or more lightning strikes are displayed in one or more different colors than corresponding non-overlapping areas of uniformly-structured kernels.

19. The apparatus of claim 18, wherein a color of an overlapping area is a function of a number of uniformly-structured kernels that overlap in that area.

20. The apparatus of claim 19, wherein different colors for overlapping areas are obtained by summing pixel values in the overlapping areas; and
wherein different pixel values map to different colors on a color continuum.

21. The apparatus of claim 14, wherein decay of the uniformly-structured kernel is shown as a decrease in size of the uniformly-structured kernel over time.

22. An apparatus for displaying lightning strikes, comprising:
a display screen which displays images;
one or more memories which store a computer program and information relating to a lightning strike; and
a processor which executes the computer program so as (i) to retrieve the information, and (ii) to display the lightning strike on the display screen based on the information, the lightning strike being displayed as a uniformly-structured kernel that decays over time, the uniformly-structured kernel having an inner portion and an outer portion, the inner portion having a higher amplitude than the outer portion, the amplitudes of the inner portion and the outer portion decreasing as the uniformly-structured kernel decays.

23. The apparatus of claim 22, wherein:
the information includes a record of lightning strikes that occurred over a period of time, each lightning strike corresponding to a uniformly-structured kernel that decays over time; and
the processor executes the computer program to control a rate at which the record of lightning strikes is displayed.

24. The apparatus of claim 22, further comprising a storm sensor which:
detects the lightning strike; and
determines a location of the lightning strike;
wherein the information relating to the lightning strike includes a location of the lightning strike.

25. The apparatus of claim 22, wherein the information relating to the lightning strike includes a time that the lightning strike occurred.

26. The apparatus of claim 25, wherein the processor (i) determines a current location of an aircraft relative to the lightning strike, and (ii) displays the current location of the aircraft relative to the lightning strike.

27. A computer program stored on a computer-readable medium, the computer program comprising code to display a lightning strike as a uniformly-structured kernel that decays over time, the uniformly-structured kernel having an inner portion and an outer portion, the inner portion having a higher amplitude than the outer portion, the amplitudes of the inner portion and the outer portion decreasing as the uniformly-structured kernel decays.

28. The computer program of claim 27, wherein the uniformly-structured kernel comprises a gaussian kernel.

29. The computer program of claim 27, further comprising code to receive an indication of the lightning strike and a location of the lightning strike;
wherein the lightning strike is displayed based on the location of the lightning strike.

30. The computer program of claim 29, further comprising code to display a location of an aircraft relative to the lightning strike.

31. The computer program of claim 27, further comprising code to display two or more lightning strikes as uniformly-structured kernels that decay over time;
wherein overlapping areas of uniformly-structured kernels for the two or more lightning strikes are displayed in one or more different colors than corresponding non-overlapping areas of uniformly-structured kernels.

32. The computer program of claim 31, wherein a color of an overlapping area is a function of a number of uniformly-structured kernels that overlap in that area.

33. The computer program of claim 32, wherein different colors for overlapping areas are obtained by summing pixel values in the overlapping areas; and
wherein different pixel values map to different colors on a color continuum.

34. The computer program of claim 27, wherein decay of the uniformly-structured kernel is shown as a decrease in size of the uniformly-structured kernel over time.

35. A computer program stored on a computer-readable medium to display lightning strikes, the computer program comprising:
code to store information relating to a lightning strike;
code to retrieve the information; and
code to display the lightning strike, based on the information, as a uniformly-structured kernel that decays over time, the uniformly-structured kernel having an inner portion and an outer portion, the inner portion having a higher amplitude than the outer portion, the amplitudes of the inner portion and the outer portion decreasing as the uniformly-structured kernel decays.

36. The computer program of claim 35, wherein the information includes a record of lightning strikes that occurred over d period of time, each lightning strike corresponding to a uniformly-structured kernel that decays over time; and further comprising c ode to control a rate at which the record of lightning strikes is displayed.

37. The computer program of claim 35, further comprising code to receive an indication of the lightning strike and the information relating to the lightning strike;

wherein the information relating to the lightning strike includes a location of the lighting strike.

38. The computer program of claim 29 wherein the information relating to the lightning strike includes a time that the lightning strike occurred.

39. The computer program of claim 35, further comprising:

code to determine a current location of an aircraft relative to the lightning strike; and code to display the current location of the aircraft relative to the lighting strike.

40. The method of claim 9, further comprising displaying a warning regarding current lightning strikes while the retrieved lightning strike information is being displayed.

41. The apparatus of claim 22, wherein the processor displays a warning regarding current lightning strikes while the retrieved lightning strike information is being displayed.

42. The computer program of claim 35, further comprising code to display a warning regarding current lightning strikes while the retrieved lightning strike information is being displayed.

* * * * *